(12) United States Patent
Achkir (10) Patent No.: US 10,557,990 B2
(45) Date of Patent: Feb. 11, 2020

(54) DYNAMIC PHOTONIC WAVEGUIDE SPLITTER/COUPLER

(71) Applicant: CISCO TECHNOLOGY, INC., San Jose, CA (US)

(72) Inventor: D. Brice Achkir, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 65 days.

(21) Appl. No.: 15/822,503

(22) Filed: Nov. 27, 2017

(65) Prior Publication Data

US 2019/0162900 A1 May 30, 2019

(51) Int. Cl.
*G02B 6/122* (2006.01)
*G02B 6/42* (2006.01)
*G02B 6/12* (2006.01)

(52) U.S. Cl.
CPC ............ *G02B 6/122* (2013.01); *G02B 6/422* (2013.01); *G02B 6/428* (2013.01); *G02B 2006/1215* (2013.01); *G02B 2006/12147* (2013.01)

(58) Field of Classification Search
CPC .... G02B 6/2817; G02B 6/125; G02B 6/2804; G02B 6/122; G02B 6/428; G02B 6/422; G02B 2006/1215; G02B 2006/12147; G02F 1/3137
See application file for complete search history.

(56) References Cited

U.S. PATENT DOCUMENTS

| 4,346,961 | A | 8/1982 | Porter |
| 5,369,719 | A | 11/1994 | Mishima et al. |
| 5,710,854 | A | 1/1998 | Myers et al. |
| 8,542,961 | B2 | 9/2013 | Kuo et al. |
| 8,938,148 | B2 | 1/2015 | Achkir |
| 9,658,397 | B1 | 5/2017 | Achkir |
| 10,048,441 | B1* | 8/2018 | Mohamed ............... G02B 6/125 |
| 2016/0327751 | A1* | 11/2016 | Wu ..................... G02B 6/29344 |

FOREIGN PATENT DOCUMENTS

CA        1302135 C        6/1992

OTHER PUBLICATIONS

Broadband directional coupling in aluminium nitride nanophotonic circuits, Matthias Stegmaier, Mar. 15, 2013.

* cited by examiner

*Primary Examiner* — John Bedtelyon
(74) *Attorney, Agent, or Firm* — Cindy Kaplan (57) ABSTRACT

In one embodiment, an apparatus includes a first channel core in communication with a second channel core and a third channel core of a photonic waveguide, a splitter/coupler module movable relative to the channel cores to dynamically adjust a ratio of optical signals at two of the channel cores of the photonic waveguide, and an actuation device operable to move the splitter/coupler module based on input received during operation of the photonic waveguide.

20 Claims, 8 Drawing Sheets

DYNAMIC PHOTONIC WAVEGUIDE SPLITTER/COUPLER

TECHNICAL FIELD

The present disclosure relates generally to optical components, and more particularly, to photonic waveguide splitters/couplers.

BACKGROUND

Photonic components have been increasingly integrated into high speed systems. At the printed circuit board (PCB) level, waveguide technology is being integrated to carry large amounts of data at higher speeds, while attempting to solve signal integrity issues associated with copper. There is also a trend towards integration of photonic components at the chip level or within the dies themselves in the case of silicon photonics.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, an apparatus generally comprises a first channel core in communication with a second channel core and a third channel core of a photonic waveguide, a splitter/coupler module movable relative to the channel cores to dynamically adjust a ratio of optical signals at two of the channel cores of the photonic waveguide, and an actuation device operable to move the splitter/coupler module based on input received during operation of the photonic waveguide.

In another embodiment, a method generally comprises receiving an optical signal ratio for a photonic waveguide comprising a plurality of channel cores and a splitter/coupler module movable relative to the channel cores to dynamically adjust a ratio of optical signals at two of the channel cores, and transmitting an electrical signal to an actuation device to move the splitter/coupler module based on the received optical signal ratio. The splitter/coupler module is movable during operation of the photonic waveguide to dynamically modify the optical signal ratio.

In yet another embodiment, a network device comprises an embedded photonic waveguide, the photonic waveguide comprising a first channel core in communication with a second channel core and a third channel core, a splitter/coupler module movable relative to the channel cores to dynamically adjust a ratio of optical signals at two of the channel cores, and an actuation device operable to move the splitter/coupler module based on input received during operation of the photonic waveguide to dynamically modify the optical signal ratio.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Conventional splitters/couplers, such as those that use standalone prisms are bulky in size and therefore not useable in small footprint applications such as chips or PCBs (Printed Circuit Boards). Furthermore, prism based systems have high losses (e.g., more than 0.5 dB for only reflecting light, plus losses associated with splitting or combining the light beams).

To enable enhanced integration of optical splitters/couplers for photonic chips and PCBs, small footprint splitters/couplers using waveguide technology may be used that can be embedded into a chip and its packaging or a PCB in its inner layers or on the surface. Conventional waveguide splitters/couplers utilize a fixed and predefined split ratio, which results in the need for different devices with different split ratios.

The embodiments described herein provide dynamic, flexible, and small footprint embedded splitters/couplers that may be implemented for any waveguide technology and used, for example, in full photonic chip or system integration. The embodiments described herein can both split and combine light, can be integrated within a chip or a PCB, and can be operated for both single mode and multimode, all with substantially the same dimensions as the waveguide itself. The embodiments enable dynamic splitting of a photonic beam with a single device, thus eliminating the need for different devices with different split ratios. The waveguide may, for example, dynamically split a photonic beam into different split ratios (e.g., 50/50 (1:1 ratio), 75/25 (3:1 ratio), or any other ratio or combination of different ratios at any number of outputs) during operation of the waveguide.

The embodiments described herein may be used for any type of waveguide, such as those using various materials to create a polymer waveguide (polymer core) or glass-type (glass core), as well as various shapes (cross-sectional shape) such as rectangles or squares (boxed waveguides), circles (cylindrical waveguides), or other materials or shapes. The waveguides may be single mode or multimode (step index or graded index) with any core size, including standard cores (e.g., single mode core sized to about 9 microns) or any other core size. The photonic waveguide splitter/coupler may be used, for example, to enable monitoring, redundancy, combining, and protection for optical links.

Figure 1:
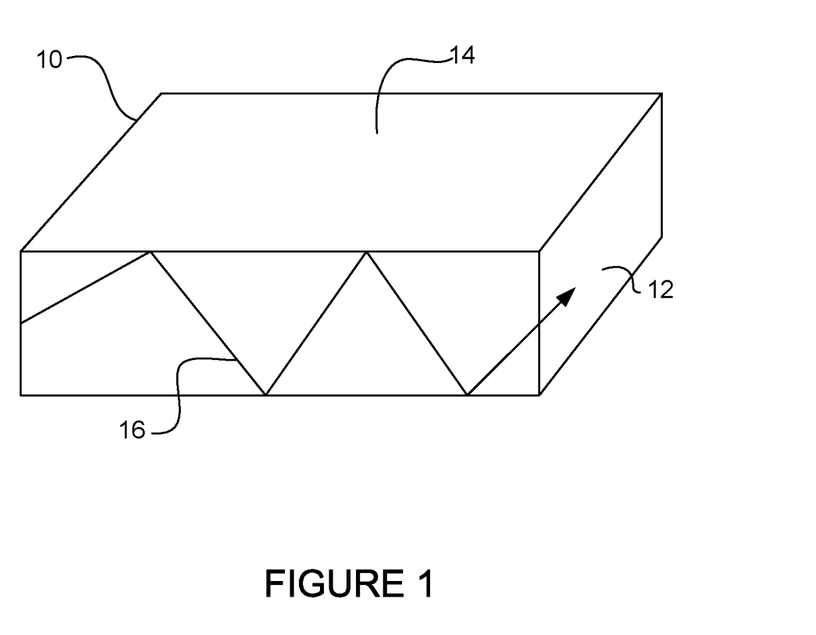
FIG. 1 illustrates an example of a waveguide channel core, in accordance with one embodiment.

Referring now to the drawings and first to FIG. 1, an example of an optical waveguide 10 is shown with a core 12 (waveguide channel core) and clad 14. The cladding may be formed from a material that has an index of refraction lower than an index of refraction of the core to create an internal reflection of light for optical communication. An optical signal 16 is shown propagating through reflection between the core and the clad due to differences between the refractive index. As described below with respect to FIGS. 2A-2F, a small dummy wave guide core 12 may be used to form a splitter/coupler module, which is movable relative to fixed waveguide arms (channel cores) to vary a ratio of optical signal power. The optical waveguide 10 shown in FIG. 1 may also be used to form one or more waveguide channel cores shown in FIG. 4.

Although many techniques may be used to build a waveguide (e.g., wet, dry, embossing, film based, mosquito core injection, etc.), the focus herein is not on the particular process to fabricate the waveguide. It is to be understood that the process described herein for forming the movable splitter/coupler module and waveguide channel cores is only an example and that any suitable fabrication technique may be used. For simplification, the description herein focuses on polymer waveguides and for further simplification, a rectangular waveguide is shown, but as readily apparent to those skilled in the art, the same concepts may be applied to other type of photonic waveguides.

Figure 2A:
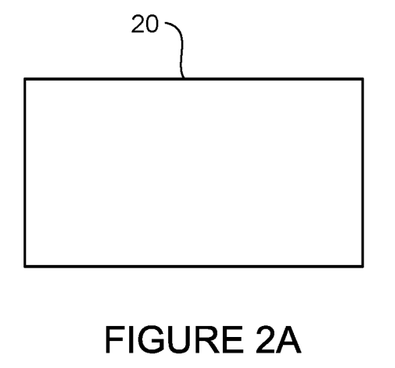
FIGS. 2A-2F illustrate steps for forming a moveable splitter/coupler module for use in varying an optical signal ratio in a photonic waveguide.
Figure 2B:
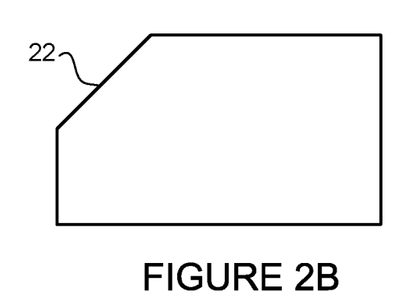
Figure 2C:
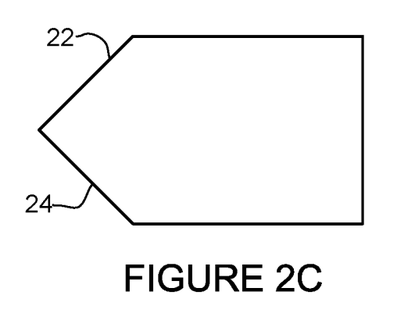

FIGS. 2A-2F illustrate an example for forming a movable splitter/coupler module, in accordance with one embodiment. The process starts with a small waveguide core 20 (FIG. 2A). Two 45 degree faces (facets) 22, 24 are cut into the core 20, as shown in FIGS. 2B and 2C.

Figure 2D:
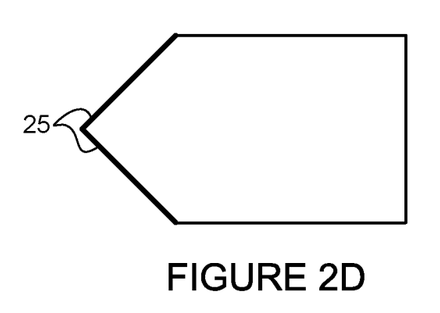

A metallic material (e.g., silver or any other suitable material) is deposited onto the two previously formed facets 22, 24 to form a reflective layer 25 (FIG. 2D). The metallic layer 25 may be deposited at the facets 22, 24 through atomic deposition, atomic deposition with a laser excimer, deposition of a layer of metallic film, or any other suitable process. As described below with respect to FIG. 5, the facets 22, 24 comprising the reflective layer 25 are configured to provide optical reflection into or from respective second and third waveguide channel cores located at correspondingly opposing sides of a first waveguide channel core.

Figure 2E:
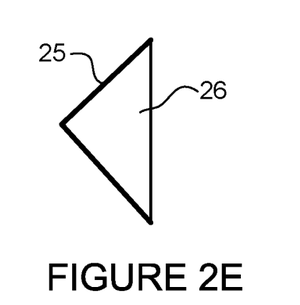
Figure 2F:
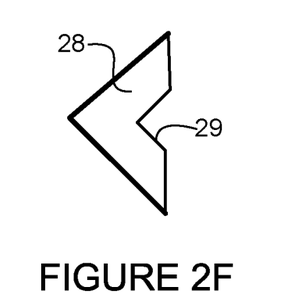

A triangular block 26 comprising the facets 22, 24 with the applied reflective layer 25 is detached from the rest of the core to obtain the reflective wedge shown in FIG. 2E. As shown in FIG. 2F, a trench 29 (angled, triangular opening) is formed in the block to provide an opening for receiving an engine (actuation device, actuator) as described below with respect to FIGS. 3A and 3B. The reflective wedge piece 28 is referred to herein as a movable splitter/coupler module. It is to be understood that the splitter/coupler module 28 shown in FIG. 2F is only an example and the shape of the opening 29, and shape and size of the reflective wedge 28 may be different than shown in FIG. 2F, without departing from the scope of the embodiments. As described below, the shape of the reflective wedge 28 corresponds to the shape, size, and edge angle of the waveguide arms and thus may vary based on the configuration of the waveguide.

Figure 3A:
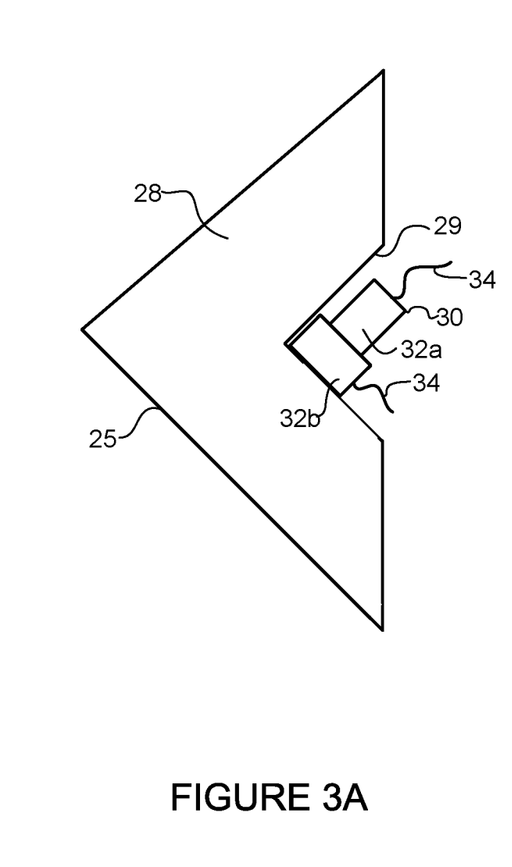
FIGS. 3A-3B illustrate an example of the splitter/coupler module with an actuation device operable to move the module.

As shown in FIG. 3A, the trench 29 receives an engine (actuator, actuation device) 30 operable to dynamically position the splitter/coupler module 28 relative to input and output waveguide channel cores to create different optical signal ratios (split ratios, optical power ratios, output ratios) in the waveguide (as described below with respect to FIGS. 5 and 6). In one embodiment, the actuation device 30 comprises two orthogonally positioned linear actuators 32a, 32b formed from a piezoelectric material that expands when an electric current is applied to the piezoelectric material. The piezoelectric material may include, for example, crystals, ceramics, or other non-conductive materials.

In one example, each of the actuators 32a, 32b provides an output of linear movement of approximately 14 μm (or any other stroke (e.g., less than 20 micrometers)) with very low voltage (e.g., 2 volts or less) input at wires 34 (partially shown in FIG. 3A) and with a small footprint that can be integrated with the splitter/coupler module 28.

It is to be understood that the actuation device 30 described herein is only an example and other displacement devices, actuators, or materials, with different input or output may be used. For example, the actuation device 30 may be formed from any suitable material with a property that may be controlled by an external stimulus (e.g., electrical current, magnetic field, temperature).

The actuators (micro-actuators) 32a, 32b may receive an external stimulus (e.g., electrical current) from a pair of wires 34 (e.g., copper wires or other conductive material (FIG. 3A). In one example, when the electrical current is applied to the actuator 32a, 32b, the material changes shape, which exerts a force on the splitter/coupler module 28. In one embodiment, a relationship between the change in size of the material and the applied electrical signal (current or voltage) may be linear.

In one embodiment shown in FIG. 3A, the actuation device 30 is attached to an internal wall of the trench 29 so that a first actuator 32a is parallel to one face and the other actuator 32b is perpendicular to the first actuator. As shown in the example of FIG. 3B, the actuation device 30 and splitter/coupler module 28 are attached to a C-shaped structure 34 made of clad material.

Figure 4:
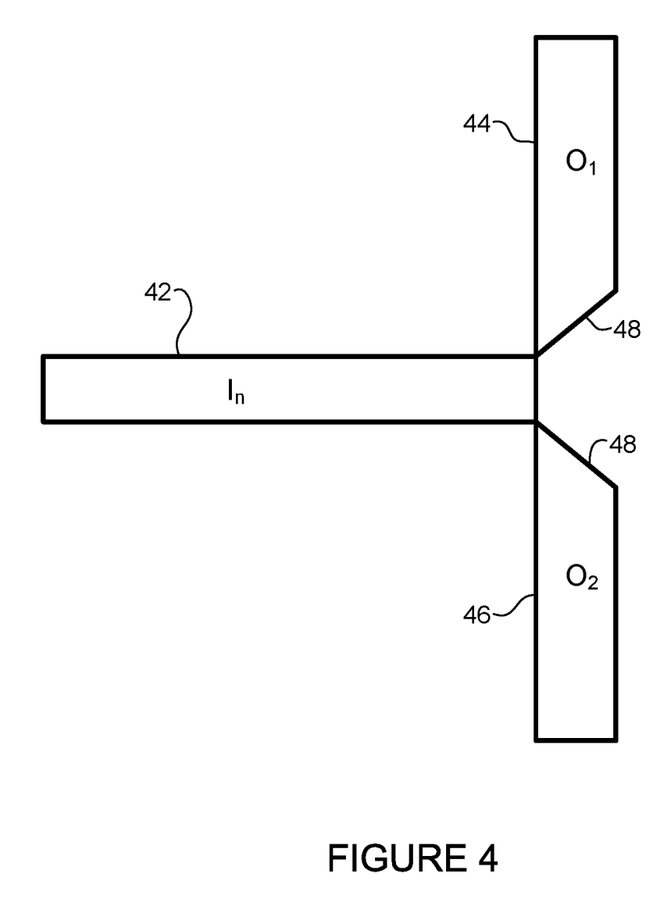
FIG. 4 illustrates an example of waveguide channel cores configured to receive the splitter/coupler module and actuation device assembly shown in FIG. 3B.

FIG. 4 illustrates one example of a three channel core waveguide comprising a first channel core 42 operating as an input (In) for an optical signal (light input) and the other two channel cores 44, 46 operating as outputs ($O_1$, $O_2$) for optical signals $SO_1$ and $SO_2$, respectively. As described in detail below with respect to FIG. 5, the movable splitter/coupler module 28 is configured to dynamically split the optical signal received from input channel core 42 between the two output channel cores 44, 46. In one example, the light output $SO_1$ may vary from 0% to 100% of the light transmitted through channel core 42, with light output $SO_2$ varying from 100% to 0% (complementary to $SO_1$). The shapes and edge angles of the channel cores 42, 44, 46 may be controlled through masks in a fabrication process, as is well known by those skilled in the art. In the example shown in FIG. 4, waveguide arms $O_1$ and $O_2$ are fabricated with edges 48 forming inputs at 45 degree angles relative to a longitudinal direction of the first channel core 42. In order to show fabrication and functionality of the device, the clad material is not shown in FIG. 4. The clad material surrounds the core except in the area formed by the two 45 degree angle inputs of $O_1$ and $O_2$ where the moveable module is inserted. The waveguide cores 42, 44, 46 (channels, channel cores, paths, guides, arms) may be created separately and combined together or the entire assembly may be created at one time in the desired shape and then all channel cores may be clad simultaneously.

Figure 3B:
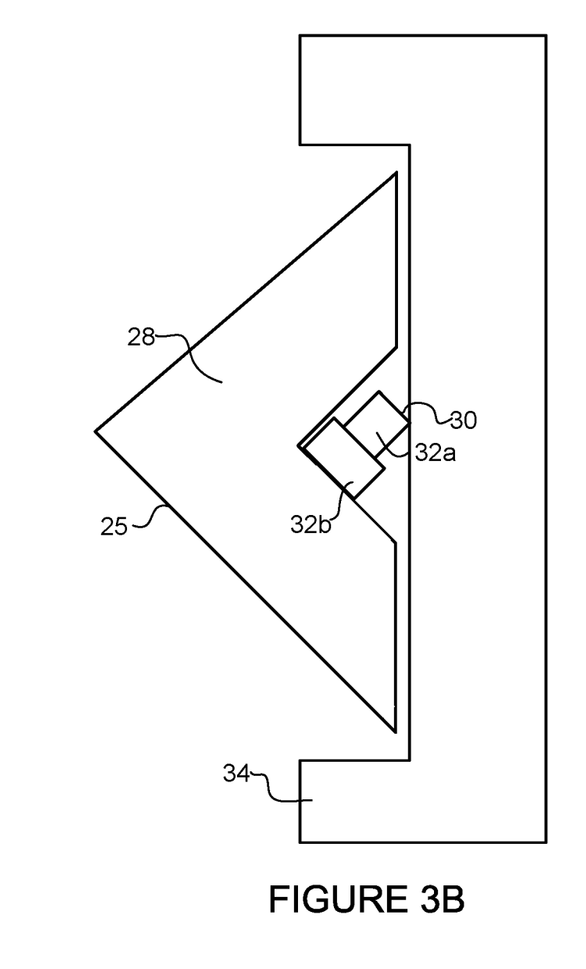
Figure 5:
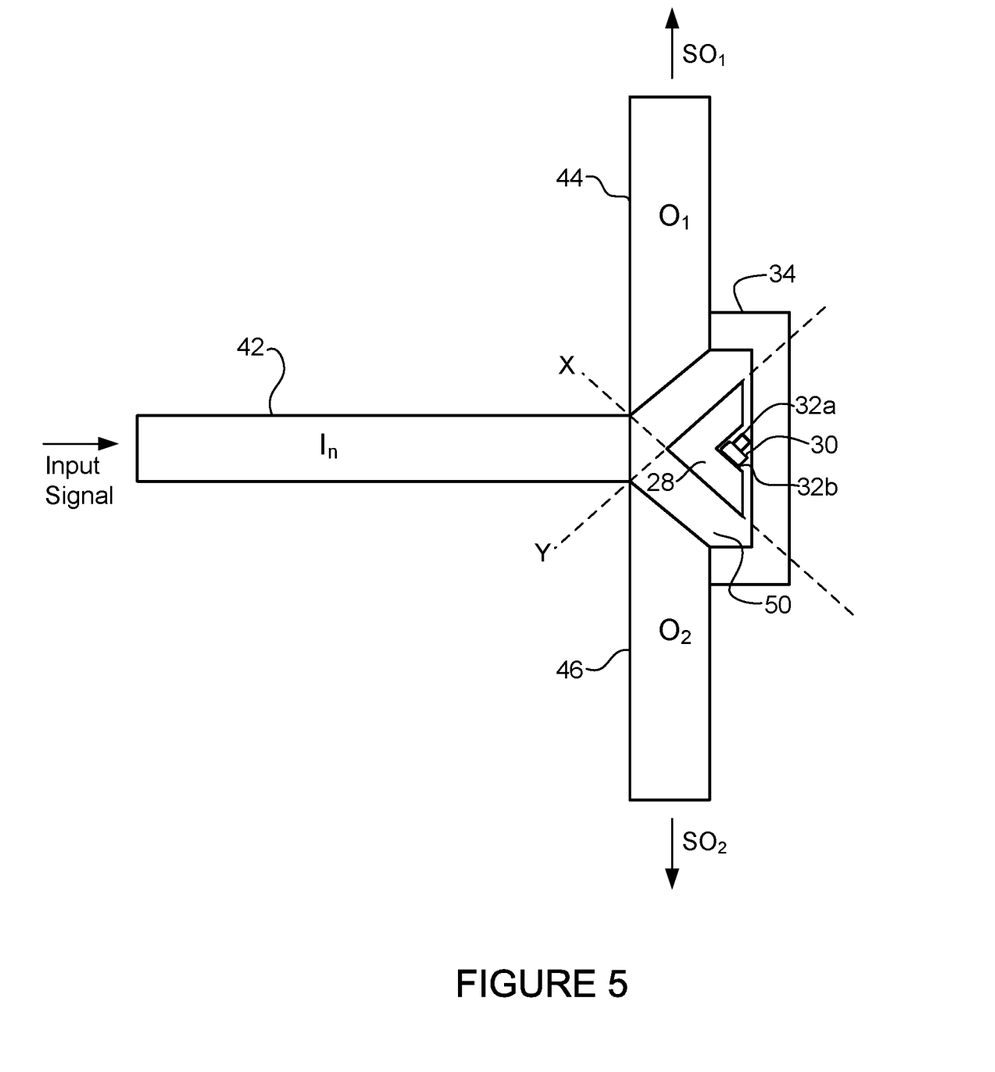
FIG. 5 is an example of a photonic waveguide formed from the channel cores shown in FIG. 4 and the splitter/coupler module and actuation device assembly of FIG. 3B positioned for a 50/50 optical signal ratio.

Once the waveguide arms are formed, the assembly is combined with the splitter/coupler module and engine sub-assembly shown in FIG. 3B to create the photonic waveguide structure shown in FIG. 5. Cavity 50 allows splitter/coupler module and engine sub-assembly to move freely and may be left filled with air or filled with a fluid having a matching index. An orthogonal X-Y axis is shown in FIG. 5 and referenced in the examples described below.

In one example, micro-actuator 32a is supplied with a voltage supply Va, while micro-actuator 32b is supplied with a voltage supply Vb. For simplification, the neutral (default) position of the movable splitter/coupler device is a split ratio (optical signal ratio) of 50/50, which corresponds to a central position (middle of all three waveguide arms) as shown in FIG. 5. The default or neutral position may be set up and programmed as needed.

With the dynamically movable splitter/couple module 28 in this neutral position, both $O_1$ and $O_2$ outputs are set to each receive half (50 percent) of the optical power from input $I_n$ (50/50 optical signal ratio). From this position, the following describes an example in which the optical signal output $SO_1$ is varied from 50% to 100% and output $SO_2$ varies in a complementary manner from 50% to 0%. In this example, the splitter/coupler module 28 moves along the Y axis and the displacement of the of the module (Dy) is only controlled by the micro-actuator 32a that is linear to the voltage supply Va, as follows:

$$Vb=0, 0<=Va<=Vmax \text{ and } Dy=k*Va$$

Where:
Vmax is the maximum voltage to move the splitter/coupler module from the neutral (50/50 split ratio) to a position contacting the 45 degree facet at $O_2$ (100/0 split ratio ($SO_1/SO_2$); and
K is a constant related to the micro-actuator.
The ratio of light coming out of $O_1$ ($SO_1$ in percentage) is given by the following relation:

$$Va=SO_1*Vmax=Dy/k.$$

In order to cover the output $O_1$ from 50% to 0% (with output $O_2$ complementary 50% to 100%), the splitter/coupler module 28 moves along the X axis from the neutral position. The displacement (Dx) of the splitter/coupler module 28 is only controlled by the micro-actuator 32b that is linear to the supply voltage Vb as follows:

$$Va=0, 0<=Vb<=Vmax \text{ and } Dx=k*Vb$$

Where:
Vmax is the maximum voltage to move the splitter/coupler module from the neutral (50/50 split ratio) to a position contacting the 45 degree facet at $O_1$ (0/100 split ratio ($SO_1/SO_2$); and
K is a constant related to the micro-actuator.
The ratio of the light coming out of $O_1$ ($SO_1$ in percentage) is given by the following relation:

$$Vb=SO_1*Vmax=Dx/k.$$

In the above example, there are two equations based on the split ratio:
If $0<=SO_1<=50\%$, the voltage $Vb=SO_1*Vmax=Dx/k$ and Va=0 (for the complimentary arm: $100\%<=SO_2<=50\%$).
If $50<=SO_1<=100\%$, the voltage $Va=SO_1*Vmax=Dy/k$ and Vb=0 (for the complimentary arm: $50\%<=SO_2<=0\%$).

Figure 6:
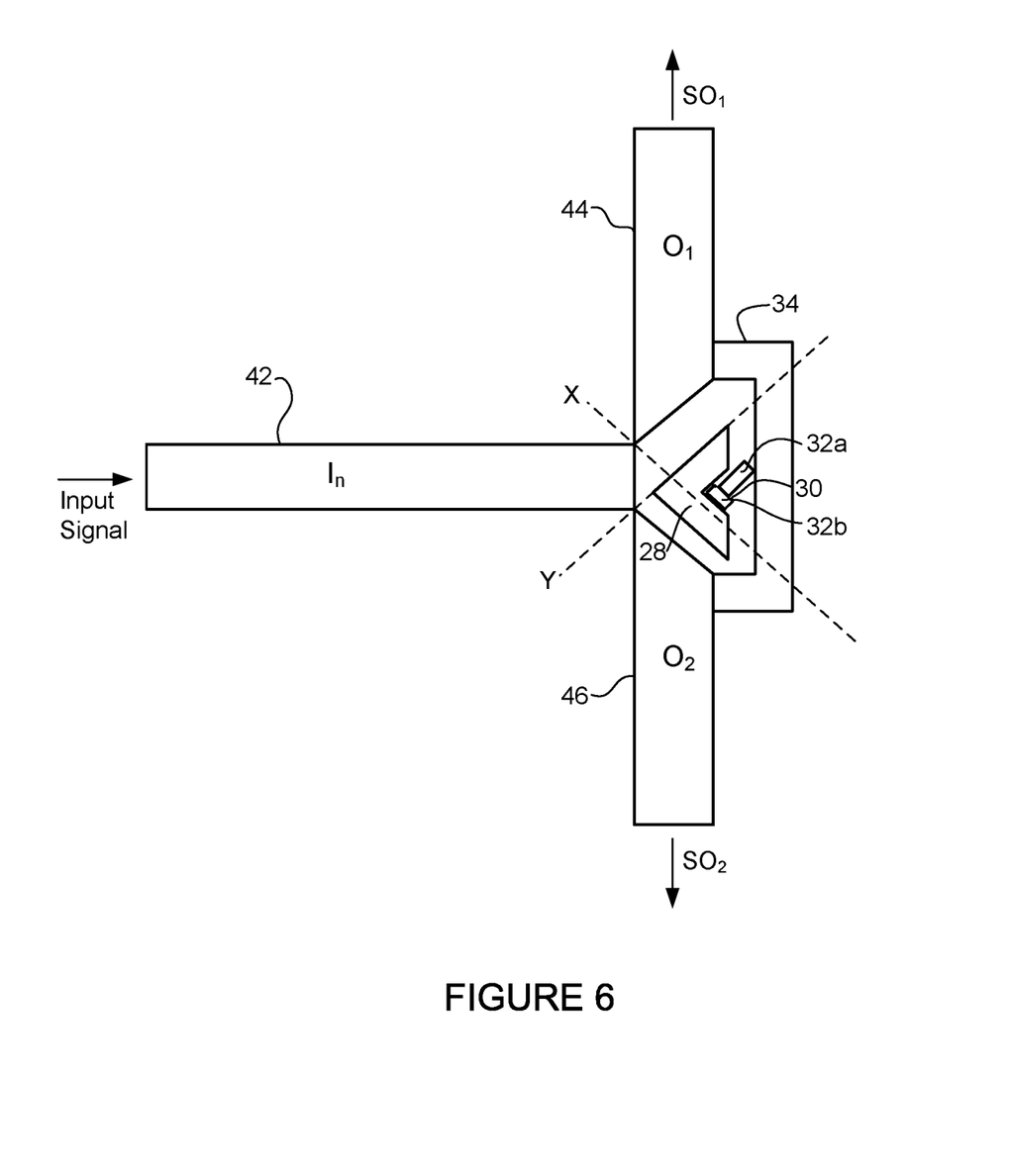
FIG. 6 illustrates the photonic waveguide of FIG. 5 with the splitter/coupler module positioned for a 75/25 optical signal ratio.

FIG. 6 illustrates an example with the splitter/coupler module 28 positioned to provide a 75/25 split ratio with 75% of the received optical signal from input $I_n$ reflected into channel core output $O_1$ and 25% of the optical signal from input $I_n$ reflected into channel core $O_2$.

The optical signal ratio may be set, for example, based on input received from a controller at the network device containing the photonic waveguide or another device in communication with the network device. The controller (or processor at the network device) may convert the desired optical signal ratio into a suitable voltage according to the above equations, for example.

The embodiments described herein may be used to define any desired splitting ratio. Also, the output channel cores may be configured in any orientation based on the desired optical paths. For example, the waveguide may be two dimensional or three-dimensional. One or more of the waveguide channel cores may extend in a direction different than one or more of the other waveguide channel cores or may be in the same direction but at an offset, as described in U.S. Pat. No. 9,658,397, for example. Any orientation may be realized with the embodiments described herein by adjusting the output orientation of the channel cores accordingly. The photonic waveguide described above may also be used as a building block for more complex splitters, such as, for example a 1-by-4 splitter (with the same or different splitting ratios) by daisy-chaining the waveguides to split the input among any number of outputs.

Figure 7:
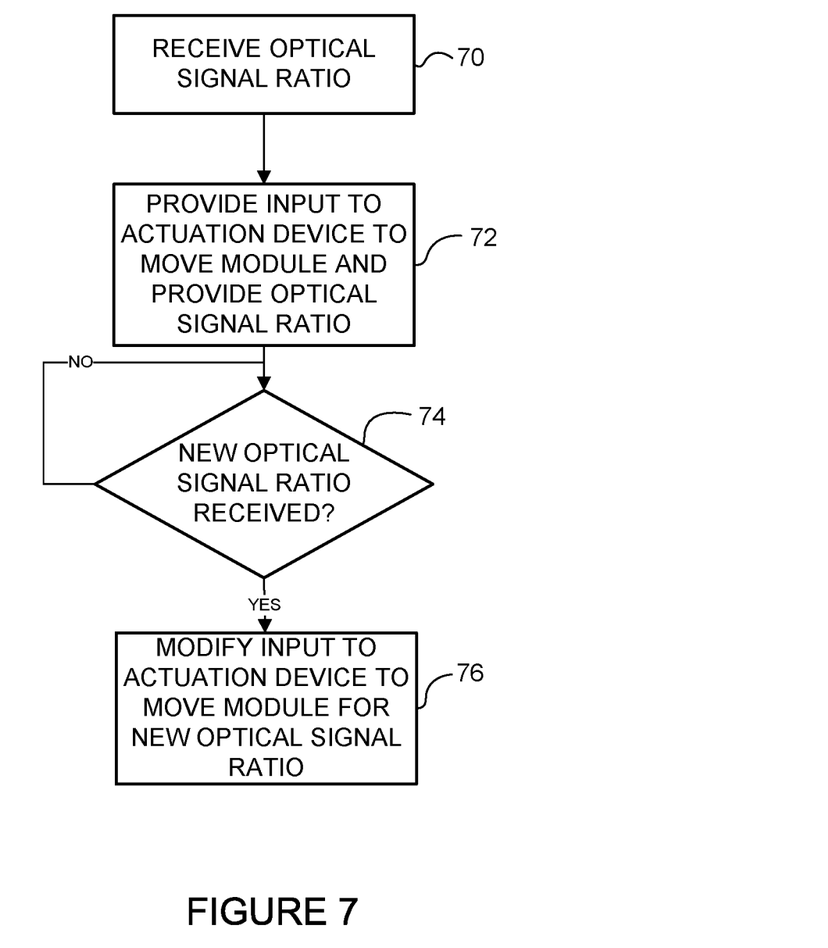
FIG. 7 is a flowchart illustrating a process for varying the optical signal ratio with a dynamic photonic waveguide splitter/coupler.

FIG. 7 is a flowchart illustrating dynamic modification of an optical signal ratio at an embedded photonic waveguide splitter/coupler, in accordance with one embodiment. At step 70, a specified optical signal output ratio is received for a photonic waveguide comprising a plurality of channel cores (e.g., channel cores 42, 44, 46 in FIG. 5) and a splitter/coupler module 28 movable relative to the channel cores to dynamically adjust an optical signal ratio at two of the channel cores. The desired optical signal ratio may be received internally (e.g., programmed at a network device, generated by a controller) or externally from another network device, controller, or user input. Based on the specified signal ratio, input is provided to an engine (actuation device) 30 to move the module 28 and provide the optical signal ratio (step 72). In one example, one or more actuators may receive a specified voltage (e.g., Va, Vb described above) based on a desired optical signal ratio as defined, for example, by a controller. In response to the input (e.g., electric current applied to one of the actuators 32a, 32b), the splitter/coupler module 28 changes position to modify the optical signal ratio. For example, a piezoelectric material may change shape in response to an electric current generated based on a command signal. The change in shape of the piezoelectric material causes the splitter/coupler module 28 to move relative to the fixed waveguide core channels 42, 44, 46, thereby changing the ratio of optical signals at the output channels. If a different optical signal ratio is desired (step 74) based on input from a controller, for example, a different voltage is input to the actuation device 30 causing the splitter/coupler module 28 to move, thereby adjusting the optical signal ratio (step 76).

This process may be repeated any number of times and may be performed periodically (e.g., to provide monitoring of the optical signal) or at any other time. For example, one or more embodiments may be used to periodically pull off a percentage (0-100%) of the optical signal to check the optical signal output. All of the optical signal may be supplied in normal operation and a portion split off to perform monitoring of the optical signal at periodic intervals or as needed for troubleshooting, for example.

It is to be understood that the process shown in FIG. 7 is only an example and that steps may be added, removed, combined, or modified, without departing from the scope of the embodiments.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Figure 8:
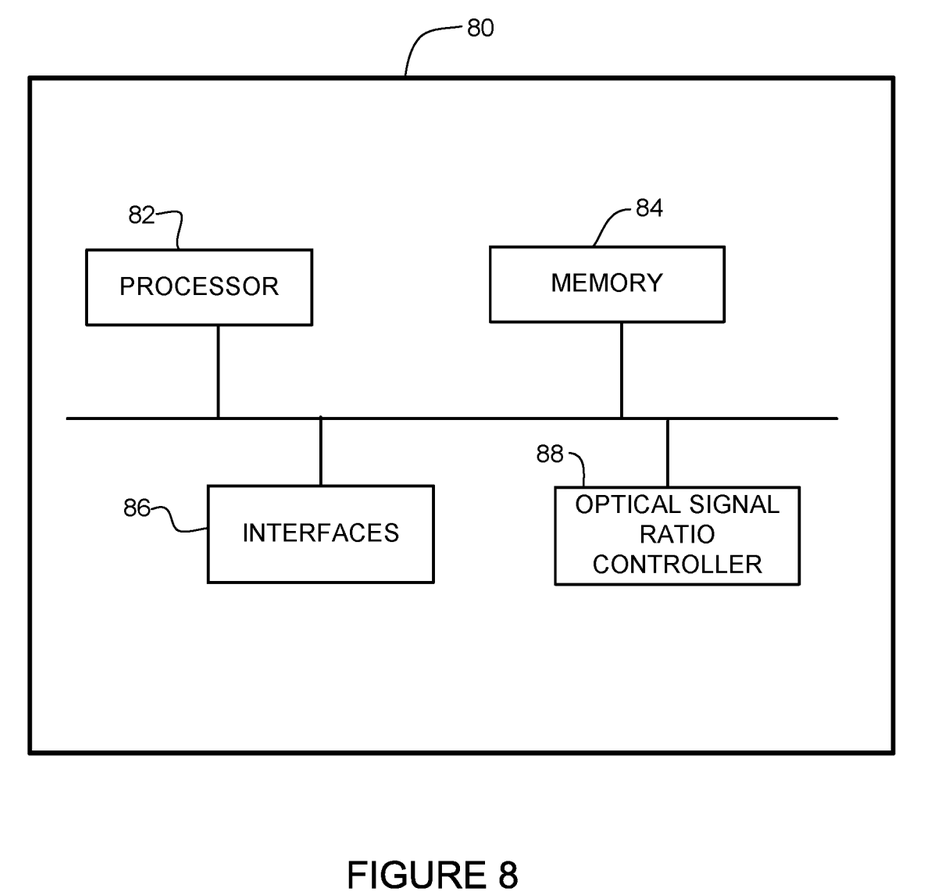
FIG. 8 depicts an example of a network device useful in implementing embodiments described herein.

FIG. 8 illustrates an example of a network device 80 that may implement the embodiments described herein. In one embodiment, the network device 80 is a programmable machine that may be implemented in hardware, software, or any combination thereof. The network device 80 includes one or more processor 82, memory 84, network interface (port) 86, and optical signal ratio controller 88.

Memory 84 may be a volatile memory or non-volatile storage, which stores various applications, operating systems, modules, and data for execution and use by the processor 82. The network device 80 may include any number of memory components. Memory 84 may include a table for converting a received command or user input to the electrical signal appropriate for the desired optical signal ratio.

Logic may be encoded in one or more tangible media for execution by the processor 82. For example, the processor 82 may execute codes stored in a computer-readable medium such as memory 84. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The processor 82 may process data received from the interfaces 86. The network device 80 may include any number of processors 82.

The network interface 86 may comprise any number of interfaces (linecards, ports) for receiving data or transmitting data to other devices. The network interface 86 may include, for example, an Ethernet interface for connection to a computer or network.

The controller 88 may generate a control signal to control movement of the module 28. The control signal may be an electrical signal, which may be generated or set based on an electrical current or a voltage. The electrical signal may be dependent on the resistance of the material used in the engine 30 and may be determined internally by the controller or based on a command received externally. The controller 88 may be a programmable device that controls the optical signal ratio in a specified manner. The controller 88 may comprise, for example, a general processor, digital signal processor, application specific integrated circuit, field programmable gate array, analog circuit, digital circuit, server processor, or any other device or combination thereof.

It is to be understood that the network device 80 shown in FIG. 8 and described above is only an example and that different configurations of network devices may be used. For example, the network device 80 may further include any suitable combination of hardware, software, algorithms, processors, devices, components, or elements operable to facilitate the capabilities described herein.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
a first channel core in communication with a second channel core and a third channel core of a photonic waveguide;
a module configured as a splitter or a coupler, wherein the module is positioned within a cavity defined in part by fixed edges of said first, second, and third channel cores, and movable relative to said fixed edges of the channel cores to dynamically adjust a ratio of optical signals at two of the channel cores of the photonic waveguide; and
an actuation device operable to move the module based on input received during operation of the photonic waveguide.

2. The apparatus of claim 1 wherein the actuation device comprises two micro-actuators operable to receive electrical input and provide a linear displacement output to move the module along two axes and provide the optical signal ratio.

3. The apparatus of claim 2 wherein the micro-actuators comprise piezoelectric linear actuators.

4. The apparatus of claim 2 wherein the linear displacement output of the micro-actuators is less than 20 micrometers.

5. The apparatus of claim 1 wherein the module comprises a reflective wedge with an internal trench shaped to receive the actuation device.

6. The apparatus of claim 1 wherein the module comprises a block positioned within an optical pathway between the channel cores and comprising two facets extending generally 45 degrees relative to one another, each of the facets comprising a reflective surface.

7. The apparatus of claim 1 wherein the cavity is formed by said edges of said first, second, and third channel cores and a retaining block in contact with two of said channel cores.

8. The apparatus of claim 7 wherein the retaining block comprises a C-shaped block in contact with two of said channel cores each comprising an angled edge.

9. The apparatus of claim 1 wherein the photonic waveguide is embedded within a photonic chip.

10. The apparatus of claim 1 wherein the photonic waveguide is embedded in a printed circuit board.

11. A method comprising:
receiving an optical signal ratio for a photonic waveguide comprising a plurality of fixed channel cores and a module configured as a splitter or a coupler and dynamically movable relative to the channel cores to dynamically adjust the optical signal ratio at two of the channel cores, wherein the module is movable between a plurality of positions within an optical pathway to vary the optical signal ratio with an optical signal output shared between said two of the channel cores or optical signal inputs received from said two of the channel cores; and transmitting an electrical signal to an actuation device to move the module based on the received optical signal ratio;

wherein the module is movable during operation of the photonic waveguide to dynamically modify the optical signal ratio.

12. The method of claim 11 wherein receiving the optical signal ratio comprises receiving a programmed optical signal ratio.

13. The method of claim 11 wherein the actuation device comprises two micro-actuators operable to receive electrical input and provide a linear displacement output to move the module along two axes and provide the optical signal ratio.

14. The method of claim 11 wherein the module comprises a reflective wedge with an internal trench shaped to receive the actuation device.

15. The method of claim 11 wherein the module comprises two facets extending generally 45 degrees relative to one another, each of the facets comprising a reflective surface.

16. The method of claim 11 wherein the module is positioned within a cavity formed by said edges of said first, second, and third channel cores and a retaining block in contact with two of said channel cores.

17. The method of claim 11 further comprising receiving a new optical signal ratio and transmitting a signal to the actuation device to move the module and provide the new optical signal ratio.

18. A network device comprising:
an embedded photonic waveguide, the photonic waveguide comprising:
a first channel core in communication with a second channel core and a third channel core;
a module configured as a splitter or a coupler and movable relative to the fixed channel cores to dynamically adjust a ratio of optical signals at two of the channel cores; and
an actuation device operable to move the module based on input received during operation of the photonic waveguide to dynamically modify the optical signal ratio;
wherein the module is movable along two axes to provide the ratio of optical signals between zero percent and one hundred percent.

19. The network device of claim 18 wherein the photonic waveguide is embedded in a photonic chip.

20. The network device of claim 18 wherein the photonic waveguide is embedded in a printed circuit board.

* * * * *